United States Patent
Kobayashi et al.

(10) Patent No.: US 7,019,069 B2
(45) Date of Patent: Mar. 28, 2006

(54) SILICONE RESIN COMPOSITION FOR WATER REPELLENT COATING

(75) Inventors: Hideki Kobayashi, Chiba Prefecture (JP); Mari Tateishi, Chiba Prefecture (JP); Toru Masatomi, Chiba Prefecture (JP)

(73) Assignee: Dow Corning Toray Silicone Co., Ltd., (JP)

( * ) Notice: Subject to any disclaimer, the term of this patent is extended or adjusted under 35 U.S.C. 154(b) by 191 days.

(21) Appl. No.: 10/467,137

(22) PCT Filed: Feb. 12, 2001

(86) PCT No.: PCT/JP02/01129

§ 371 (c)(1), (2), (4) Date: Sep. 8, 2003

(87) PCT Pub. No.: WO02/062910

PCT Pub. Date: Aug. 15, 2002

(65) Prior Publication Data

US 2004/0050297 A1     Mar. 18, 2004

(30) Foreign Application Priority Data

Feb. 9, 2001 (JP) .............................. 2001-033877

(51) Int. Cl.
   *C08L 83/04* (2006.01)
(52) U.S. Cl. ............. 524/588; 524/266; 524/268; 524/379; 524/493; 524/731; 524/860; 524/862
(58) Field of Classification Search ........ 524/266, 524/588, 379, 268, 731, 860, 863, 493
   See application file for complete search history.

(56) References Cited

U.S. PATENT DOCUMENTS

| | | | |
|---|---|---|---|
| 4,539,351 A * | 9/1985 | O'Malley et al. ........ 524/43 |
| 4,618,646 A * | 10/1986 | Takago et al. ........... 524/783 |
| 4,639,489 A * | 1/1987 | Aizawa et al. ........... 524/588 |
| 5,755,867 A | 5/1998 | Chikuni et al. | |
| 6,372,830 B1 * | 4/2002 | Sato et al. ............... 524/266 |
| 6,498,197 B1 * | 12/2002 | Bialek et al. ............. 516/55 |
| 6,512,015 B1 * | 1/2003 | Elms et al. .............. 516/118 |

* cited by examiner

*Primary Examiner*—Jeffrey B. Robertson
(74) *Attorney, Agent, or Firm*—Robert L. McKellar; McKellar IP Law, PLLC

(57) ABSTRACT

Resinous composition comprising: (A) 100 weight parts of $$(R_2SiO_{2/2})_w(RSiO_{3/2})_x(SiO_{4/2})_y(O_{1/2}R^1)_z$$

wherein R is selected from the group consisting of monovalent hydrocarbon groups having 1 to 10 carbon atoms, $R^1$ is selected from the group consisting of the hydrogen atom and saturated hydrocarbon groups having from 1 to 6 carbon atoms, w is a number from 0 to 0.2, x is a number from 0.4 to 0.9, y is a number from 0.1 to 0.6, z is a number from 0.1 to 0.5, and (w+x+y)=1;
(B) 20 to 150 weight parts of an alcohol-based solvent;
(C) 100 to 1000 weight parts of a solvent selected from the group consisting of hydrocarbon-based solvents and polydimethylsiloxanes described by the formula $Me_3SiO(Me_2SiO)_nSiMe_3$, wherein Me is the methyl group and n has a value of 0 or 1;
(D) 1 to 100 weight parts of a coupling agent selected from the group consisting of alkoxysilanes and silane coupling agents;
(E) 0.1 to 20 weight parts of a condensation catalyst, and
(F) 0.1 to 20 weight parts of a polyoxyalkylene-modified silicone.

10 Claims, No Drawings

SILICONE RESIN COMPOSITION FOR WATER REPELLENT COATING

FIELD OF THE INVENTION

The present invention relates to a silicone resin composition for a water-repellent coating, and more particularly to a silicone resin composition for a water-repellent coating capable of forming high-hardness coating films with excellent water repellency when cured.

BACKGROUND AND PRIOR ART

In conventional practice, curable silicone resin compositions are widely used as coating agents for providing the surfaces of various inorganic materials with water repellency or water resistance. Such silicone resin compositions for coatings use primarily polymethylsilsesquioxanes composed of siloxane units (hereinafter "T-units") described by formula $CH_3SiO_{3/2}$, and methylsilicone resins composed of T-units and siloxane units (hereinafter "D-units") described by formula $(CH_3)_2SiO_{2/2}$. Such silicone resins are disadvantageous, however, in that the coating agent used for the base fails to provide adequate film hardness. Japanese Patent Application Publication (Kokai) No. Hei 2-8273 proposes a coating agent obtained by adding colloidal silica for use in forming high-hardness films. This agent, however, has inadequate storage stability and requires further improvement.

It is an object of the present invention to provide a silicone resin composition for a water-repellent coating that has excellent storage stability and is capable of forming high-hardness coating films with excellent water repellency when cured.

SUMMARY OF THE INVENTION

The present invention deals with a resinous water-repellent coating composition comprising (A) 100 weight parts of a polyorganosiloxane described by the average formula $(R_2SiO_{2/2})_w(RSiO_{3/2})_x(SiO_{4/2})_y(O_{1/2}R^1)_z$ wherein R is selected from the group consisting of monovalent hydrocarbon groups having 1 to 10 carbon atoms, $R^1$ is selected from the group consisting of the hydrogen atom and saturated hydrocarbon groups having from 1 to 6 carbon atoms, w is a number from 0 to 0.2, x is a number from 0.4 to 0.9, y is a number from 0.1 to 0.6, z is a number from 0.1 to 0.5, and (w+x+y)=1; (B) 20 to 150 weight parts of an alcohol-based solvent; (C) 100 to 1000 weight parts of a solvent selected from the group consisting of hydrocarbon-based solvents and polydimethylsiloxanes described by the formula $Me_3SiO(Me_2SiO)_nSiMe_3$, wherein Me is the methyl group and n has a value of 0 or 1; (D) 1 to 100 weight parts of a coupling agent selected from the group consisting of alkoxysilanes and silane coupling agents; (E) 0.1 to 20 weight parts of a condensation catalyst, and (F) 0.1 to 20 weight parts of a polyoxyalkylene-modified silicone.

DETAILED DESCRIPTION OF THE INVENTION

The present invention will now be described in detail. The polyorganosiloxane of component (A) is a silicone resin whose average constituent units are expressed by the formula $(R_2SiO_{2/2})_w(RSiO_{3/2})_x(SiO_{4/2})_y(O_{1/2}R^1)_z$. In this formula, R is a $C_1$ to $C_{10}$ monovalent hydrocarbon group such as methyl, ethyl, propyl, or other alkyl group; vinyl, allyl, 5-hexenyl, or other alkenyl group; or phenyl or other aryl group, of which methyl is preferred. $R^1$ is hydrogen atom or a $C_1$ to $C_6$ saturated hydrocarbon group. Methyl, ethyl, propyl, and other alkyl groups can be cited as examples of saturated hydrocarbon groups, of which methyl and ethyl are preferred. In the formula, w is a number from 0 to 0.2, x is a number from 0.4 to 0.9, y is a number from 0.1 to 0.6, z is a number from 0.1 to 0.5, and (w+x+y)=1. In particular, an x-value of 0.6 to 0.9 is preferred.

The polyorganosiloxane of component (A) can be produced by the hydrolysis and condensation of, for example, a diorganodialkoxysilane described by formula $R_2Si(OR^1)_2$, an organotrialkoxysilane described by formula $RSi(OR^1)_3$, and a tetraalkoxysilane described by formula $Si(OR^1)_4$. Examples of suitable diorganodialkoxysilanes include dimethyldimethoxysilane, dimethyldiethoxysilane, and dimethyldiisopropoxysilane. Examples of suitable organotrialkoxysilanes include methyltrimethoxysilane, methyltriethoxysilane, methyltriisopropoxysilane, ethyltrimethoxysilane, and ethyltriethoxysilane. Examples of suitable tetraalkoxysilanes include tetramethoxysilane, tetraethoxysilane, and tetraisopropoxysilane. The tetraalkoxysilanes may be replaced by partial hydrolysates thereof. Such partial hydrolysates are marketed, for example, by Tama Chemicals under the registered trade names of Silicate 40 and Silicate 45. The tetraalkoxysilanes may be replaced by colloidal silica completely or in part. Although water-dispersed colloidal silica and colloidal silica dispersed in an organic solvent are cited as examples of suitable colloidal silica, products obtained by dispersing colloidal silica in methanol, isopropanol, and other alcohols are preferred over such water-dispersed types. The colloidal silica should preferably have a mean grain size of 5 to 100 μm. In particular, combined use of a colloidal silica with a mean grain size of 20 μm or less and a colloidal silica whose mean grain size is greater than 20 μm is preferred, and the mixing ratio thereof should preferably be such that the proportion of the colloidal silica whose mean grain size exceeds 20 μm is 20 to 95 wt %. A method in which an organotrialkoxysilane and a diorganodialkoxysilane are hydrolyzed in the presence of colloidal silica is cited with respect to the use of colloidal silica. In preferred practice, the organotrialkoxysilane and diorganodialkoxysilane are added to the colloidal silica, water is then added in a timely manner, and the system is heated and condensed.

The alcohol-based solvent of component (B) is a diluting solvent designed to improve the dispersibility and storage stability of the polyorganosiloxane component (A). Specific examples include methanol, ethanol, isopropanol, butanol, and isobutanol. These alcohol-based solvents may also contain small amounts of water. Component (B) should be added in an amount of 20 to 150 weight parts, and preferably 50 to 140 weight parts, per 100 weight parts of component (A). This is because adding less than 20 weight parts component (B) has an adverse effect on the dispersion stability of component (A), whereas adding more than 150 weight parts sometimes causes whitening and impairs coating properties during application.

The hydrocarbon-based solvent of component (C) and/or the dimethylsiloxane described by formula $Me_3SiO(Me_2SiO)_nSiMe_3$ are diluting solvents designed to provide better coating properties. In the formula, Me is a methyl group, and n is 0 or 1. Examples of suitable hydrocarbon-based solvents include toluene, xylene, and other aromatic hydrocarbons; hexane, octane, heptane, ligroin, and other aliphatic hydrocarbons; and chloroform, methylene chloride, carbon tetrachloride, chlorobenzene, and other chlorinated hydrocarbon solvents. These solvents can be used singly or as mixtures of two or more components. Combined use of such hydrocarbon-based solvents and dimethylsiloxane is preferred, and the mixing ratio (weight) thereof should preferably fall within a range of 95:5 to 40:60. Component (C) is added in an amount of 100 to 1000 weight parts per 100 weight parts of component (A). This is because adding less than 100 weight parts has an adverse effect on the smoothness of the coating film.

The alkoxysilane and silane coupling agent of component (D) are components designed to improve the adhesion of the inventive coating film. Examples of suitable alkoxysilanes include methyltrimethoxysilane, methyltriethoxysilane, methyltriisopropoxysilane, ethyltrimethoxysilane, ethyltriethoxysilane, and other alkyltrialkoxysilanes; and tetramethoxysilane, tetraethoxysilane, tetraisopropoxysilane, and other tetraalkoxysilanes. Examples of suitable silane coupling agents include 3-aminopropyltrimethoxysilane, 3-aminopropyltriethoxysilane, 3-(2-aminoethyl)aminopropyltrimethoxysilane, 3-(2-aminoethyl)aminopropyl-triethoxysilane, 3-(2-aminoethyl)aminopropylmethyldimethoxysilane, 3-(2-aminoethyl)aminopropylmethyldiethoxysilane, and other aminosilane coupling agents; and 3-glycidoxypropyltrimethoxysilane, 3-glycidoxypropylmethyl-dimethoxysilane, and other epoxysilane coupling agents; as well as 3-mercaptopropyl trimethoxysilane, 3-methacryloxypropyltrimethoxysilane, and the like. These alkoxysilanes and silane coupling agents may be used jointly, and the mixing ratio by weight thereof should preferably fall within a range of 100:0 to 10:90. Component (D) is added in an amount of 1 to 100 weight parts per 100 weight parts of component (A). This is because adding less than 1 weight part fails to improve the adhesion of the present composition, whereas adding more than 100 weight parts has an adverse effect on the curability of the coating film.

The condensation catalyst of component (E) may be a conventionally known silicone resin condensation catalyst such as dibutyltin diacetate, dibutyltin dioctoate, dibutyltin dilaurate, dibutyltin dimalate, dioctyltin dilaurate, dioctyltin dimalate, tin octylate, or another organotin compound; isopropyltriisostearoyl titanate, isopropyltris(dioctylpyrophosphate) titanate, bis(dioctylpyrophosphate) oxyacetate titanate, tetraalkyl titanate, or another organotitanate compound; tetrabutyl zirconate, tetrakis(acetylacetonate) zirconium, tetraisobutyl zirconate, butoxytris(acetylacetonate) zirconium, zirconium naphthenate, or another organozirconium compound; tris(ethylacetoacetonate) aluminum, tris(acetylacetonate) aluminum, or another organoaluminum compound; zinc naphthenate, cobalt naphthenate, cobalt octylate, or another organometallic compound; or diethanolamine, triethanolamine, or another amine-based catalyst devoid of organosilicon compounds. Component (E) should preferably be added in an amount of 0.1 to 20 weight parts, and preferably 1 to 10 weight parts, per 100 weight parts of component (A). This is because adding less than 0.1 weight part of component (E) has an adverse effect on the curing properties of the present composition, whereas adding more than 20 weight parts impairs storage stability.

Although the present composition comprises the above-described components (A) to (E), a polyoxyalkylene-modified silicone (F) should preferably be added as well. The polyoxyalkylene-modified silicone is a linear siloxane having polyoxyalkylene groups at the ends of molecular chains or in side chains of the linear siloxane. These groups are polyoxyethylene groups or groups resulting from block or random bonding of oxypropylene groups and/or oxyethylene groups. Methyl groups should preferably serve as the groups that are attached to silicon atoms and are not polyoxyalkylene groups. These may be partially substituted by phenyl groups and other hydrocarbon groups. The polyoxyalkylene-modified silicone should preferably have a viscosity of 100 to 100,000 mPa·s at 25° C. Component (F) is added in an amount of 0.1 to 20 weight parts per 100 weight parts of component (A). This is because adding less than 0.1 weight part component (F) has no discernible effect, whereas adding more than 20 weight parts impairs the storage stability of the present compositions.

Organic solvents other than components (B) and (C); coloring pigments, anticorrosive pigments, and other pigments; antimicrobials agents; antifouling agents; and the like may also be appropriately added as needed to the present composition. Examples of organic solvents other than components (B) and (C) include methyl ethyl ketone, methyl isobutyl ketone, and other ketone-based solvents, as well as diethyl ether and other ether-based solvents.

The present silicone resin composition for a water-repellent coating is characterized in that excellent storage stability and applicability can be achieved and that a hard film with excellent water repellency and a pencil hardness of 5 H or greater can be formed by applying the composition to the surface of a substrate and heating the resulting coating. Examples of suitable substrates include glass, ceramic, metal (such as iron, stainless steel, and aluminum), and other inorganic substrates, as well as plastic, wood, and other organic substrates. The substrates may be shaped as plates, blocks, films, or powders. Of these, iron powder, ferrite powder, and other inorganic powders are preferred for the proposed water-repellent coating agent. In particular, carrier nuclear particles for electrostatic image development can be coated with the proposed water-repellent coating agent. The material may be applied by spray coating, roll coating, or dip coating. The coated material is commonly heated at a temperature of 50 to 350° C.

EXAMPLE

The present invention will now be described in detail through working examples. In the working examples, "parts" refers to weight parts, and "viscosity" denotes values measured at 25° C.

Working Example 1

Dimethyldimethoxysilane (20 g), methyltrimethoxysilane (180 g), and methanol-dispersed colloidal silica (mean grain size: 13 µm; solid silica content: 30 wt %; amount added: 80 g) were introduced and mixed inside a flask, and water (36 g) was then admixed. The system was stirred for 2 hours under heating and refluxing. The product was then cooled, yielding 315 g of a methanol solution containing 132 g of polymethylsiloxane. Gas chromatographic analysis demonstrated the absence of methyltrimethoxysilane in the methanol solution. It was also determined by $^{29}$Si-NMR and $^{13}$C-NMR analyses that the resulting polymethylsiloxane was a branched polymethylsiloxane whose average constituent units were described by formula

Toluene (230 parts), hexamethyldisiloxane (79 parts), methyltrimethoxysilane (12 parts), 3-(2-aminoethyl)aminopropylmethyldimethoxysilane (1 part), and dibutyltin dilaurate (4 parts) were admixed into 239 parts of the polymethylsiloxane methanol solution (polymethylsiloxane content: 100 parts), yielding a silicone resin composition for a water-repellent coating.

The resulting composition was a transparent solution that formed a uniform film when poured onto a glass slide. The film was placed in an oven at a temperature of 200° C. for 30 minutes. The film was allowed to cool and was measured for pencil hardness, which was found to be 8H. The contact angle of the film with water was 100°.

Working Example 2

Methyltrimethoxysilane (200 g) and methanol-dispersed colloidal silica (mean grain size: 13 μm; solid silica content: 30 wt %; amount added: 80 g) were introduced and mixed inside a flask, and water (36 g) was then admixed. The system was stirred for 2 hours under heating and refluxing. The product was then cooled, yielding 315 g of a methanol solution containing 132 g of polymethylsiloxane. Gas chromatographic analysis revealed the absence of methyltrimethoxysilane in the methanol solution. It was also determined by of $^{29}$Si-NMR and $^{13}$C-NMR analyses that the resulting polymethylsiloxane was a branched polymethylsiloxane whose average constituent units were expressed by the formula $(CH_3SiO_{3/2})_{0.77}(SiO_{4/2})_{0.23}(O_{1/2}CH_3)_{0.17}$ Toluene (235 parts), hexamethyldisiloxane (80 parts), methyltrimethoxysilane (13 parts), and dibutyltin dilaurate (4 parts) were admixed into 239 parts of the polymethylsiloxane methanol solution (polymethylsiloxane content: 100 parts), yielding a silicone resin composition for a water-repellent coating.

The resulting composition was a transparent solution with a specific gravity of 0.91 at 25° C., a viscosity of 1.2 mm$^2$/s, and a refractive index of 1.426. A uniform film was obtained when the solution was poured onto a glass slide. The film was also placed in an oven at 200° C. for 30 minutes. The film was allowed to cool and was measured for pencil hardness, which was found to be 8H. The contact angle of the film with water was 99°.

Working Example 3

Methyltrimethoxysilane (200 g), a methanol-dispersed colloidal silica (solid silica content: 40 wt %; amount added: 55 g) with a mean grain size of 23 μm, and a methanol-dispersed colloidal silica (solid silica content: 25 wt %; amount added: 8 g) with a mean grain size of 10 μm were introduced and mixed inside a flask, and water (36 g) was then admixed. The system was stirred for 2 hours under heating and refluxing. The product was then cooled, yielding 298 g of a methanol solution containing 132 g of polymethylsiloxane. Gas chromatographic analysis revealed the absence of methyltrimethoxysilane in the methanol solution. It was determined by $^{29}$Si-NMR and $^{13}$C-NMR analyses that the resulting polymethylsiloxane was a branched polymethylsiloxane whose average constituent units were expressed by the formula $(CH_3SiO_{3/2})_{0.77}(SiO_{4/2})_{0.23}(O_{1/2}CH_3)_{0.17}$ Toluene (235 parts), hexamethyldisiloxane (75 parts), methyltrimethoxysilane (12 parts), and dibutyltin dilaurate (3.5 parts) were admixed into 226 parts of the polymethylsiloxane methanol solution (polymethylsiloxane content: 100 parts), yielding a silicone resin composition for a water-repellent coating.

The resulting composition was a transparent solution whose specific gravity at 25° C. was 0.91. A uniform film was obtained when the solution was poured onto a glass slide. The film was placed in an oven at 200° C. for 30 minutes. The film was allowed to cool and was measured for pencil hardness, which was found to be 9H. The contact angle of the film with water was 100°.

Working Example 4

Methyltrimethoxysilane (180 g), partially hydrolyzed tetraethoxysilane (viscosity: 3 mm$^2$/s; specific gravity: 1.05; SiO$_2$ content: 40 wt %; amount added: 15 g), methanol-dispersed colloidal silica (mean grain size: 13 μm; solid silica content: 30 wt %; amount added : 60 g), and dimethyldimethoxysilane (20 g) were introduced and mixed inside a flask, and water (36 g) was then admixed. The system was stirred for 2 hours under heating and refluxing. The product was then cooled, yielding 310 g of a methanol solution containing 132 g of polymethylsiloxane. Gas chromatographic analysis revealed the absence of methyltrimethoxysilane in the methanol solution. It was determined by $^{29}$Si-NMR and $^{13}$C-NMR analyses that the resulting polymethylsiloxane was a branched polymethylsiloxane whose average constituent units were expressed by the formula $((CH_3)_2SiO_{2/2})_{0.09}(CH_3SiO_{3/2})_{0.7}(SiO_{4/2})_{0.21}(O_{1/2}CH_3)_{0.16}$ Toluene (230 parts), hexamethyldisiloxane (77 parts), methyltrimethoxysilane (12 parts), 3-(2-aminoethyl)aminopropylmethyldimethoxysilane (1 part), polyoxyethylene-modified dimethylsiloxane (polyoxyethylene chain content: 47 wt %; viscosity: 270 mm$^2$/s; specific gravity: 1.03; amount added: 2 parts), and dibutyltin dilaurate (4 parts) were admixed into 239 parts of the polymethylsiloxane methanol solution (polymethylsiloxane content: 100 parts), yielding a silicone resin composition for a water-repellent coating.

The resulting composition was a transparent solution that formed a uniform film when poured onto a glass slide. The film was also placed in an oven at 200° C. for 30 minutes. The film was allowed to cool and was measured for pencil hardness, which was found to be 7H. The contact angle of the film with water was 102°.

Comparative Example 1

A methanol solution containing 108 g of polymethylsiloxane was obtained in an amount of 235 g in the same manner as in Working Example 1 except that the methanol-dispersed colloidal silica (mean grain size: 13 μm, solid silica content: 30 wt %) used in Working Example 1 was dispensed with. It was determined by $^{29}$Si-NMR and $^{13}$C-NMR analyses that the resulting polymethylsiloxane was a branched polymethylsiloxane whose average constituent units were described by formula $((CH_3)_2SiO_{2/2})_{0.11}(CH_3SiO_{3/2})_{0.89}(O_{1/2}CH_3)_{0.28}$ Toluene (230 parts), hexamethyldisiloxane (79 parts), methyltrimethoxysilane (12 parts), 3-(2-aminoethyl)aminopropylmethyldimethoxysilane (1 part), and dibutyltin dilaurate (4 parts) were admixed into 217 parts of the polymethylsiloxane methanol solution (polymethylsiloxane content: 100 parts), yielding a silicone resin composition for a water-repellent coating.

The resulting composition was a transparent solution that formed a uniform film when poured onto a glass slide. The film was also placed into an oven at 200° C. for 30 minutes. The film was allowed to cool and was measured for pencil hardness, which was found to be 3H, indicating that the hardness was lower than that achieved when the present composition was formed into a film. The contact angle of the film with water was 100°.

What is claimed is:

1. A resinous water-repellent coating comprising:
   (A) 100 weight parts of a polyorganosiloxane described by the average formula $(R_2SiO_{2/2})w(RSiO_{3/2})x(SiO_{4/2})y(O_{1/2}R')_z$, wherein R selected from the group consisting of monovalent hydrocarbon groups having 1 to 10 carbon atoms, R' is selected from the group consisting of the hydrogen atom and saturated hydrocarbon groups having from 1 to 6 carbon atoms, w is a number from 0 to 0.2, x is a number from 0.4 to 0.9, y is a number from 0.1 to 0.6, z is a number from 0.1 to 0.5, and (w+x+y)=1;
   (B) 20 to 150 weight parts of an alcohol-based solvent;
   (C) 100 to 1000 weight parts of a solvent selected from the group consisting of hydrocarbon-based solvents and polydimethylsiloxanes described by formula $Me_3SiO(Me_2SiO)nSiMe_3$, wherein Me is the methyl group, and n has a value of 0 or 1;
   (D) 1 to 100 weight parts of a coupling agent selected from the group consisting of alkoxysilanes and silane coupling agents;
   (E) 0.1 to 20 weight parts of a condensation catalyst, and
   (F) 0.1 to 20 weight parts of a polyoxyalkylene-modified silicone.

2. The resin composition of claim 1, wherein the $(SiO_{4/2})$ units in component (A) are derived from colloidal silica.

3. The resin composition of claim 1, wherein the polyorganosiloxane of component (A) is obtained by the hydrolysis and condensation of an organotrialkoxysilane in the presence of colloidal silica.

4. The resin composition of claim 2, wherein the polyorganosiloxane of component (A) is obtained by the hydrolysis and condensation of an organotrialkoxysilane and a diorganodialkoxysilane in the presence of colloidal silica.

5. The resin composition of claim 2 wherein there is a combination of colloidal silica having a mean grain size greater than 20 μm and a colloidal silica having a mean grain size of 20 μm or less.

6. The resin composition of claim 1, wherein x has a value of 0.6 to 0.9.

7. The resin composition of claim 2, wherein the colloidal silica has a mean grain size of 5 to 100 μm.

8. The resin composition of claim 1 comprising 50 to 140 weight parts of component (B) per 100 weight parts of component (A).

9. The resin composition of claim 1 wherein component (C) comprises a mixture of a hydrocarbon-based solvent and poly dimethylsiloxane in a weight ratio within a range of 95:5 to 40:60.

10. The resin composition of claim 1 further comprising wherein (F) is 0.1 to 20 weight parts of a polyoxyalkylene-modified silicone having a viscosity of 100 to 100,000 mPa.s at 25° C.

* * * * *